(12) United States Patent
Achar et al.

(10) Patent No.: US 10,949,311 B2
(45) Date of Patent: Mar. 16, 2021

(54) METHOD AND SYSTEM FOR RESTORING HISTORIC DATA OF AN ENTERPRISE

(71) Applicant: WIPRO LIMITED, Bangalore (IN)

(72) Inventors: Chandramohan Achar, Bangalore (IN); Mohideen Abdul Kadar, Tiruchirappalli (IN)

(73) Assignee: Wipro Limited, Bangalore (IN)

( * ) Notice: Subject to any disclaimer, the term of this patent is extended or adjusted under 35 U.S.C. 154(b) by 375 days.

(21) Appl. No.: 15/941,013

(22) Filed: Mar. 30, 2018

(65) Prior Publication Data

US 2019/0251000 A1 Aug. 15, 2019

(30) Foreign Application Priority Data

Feb. 15, 2018 (IN) .............................. 201841005759

(51) Int. Cl.
| | |
|---|---|
| *G06F 11/00* | (2006.01) |
| *G06F 11/14* | (2006.01) |
| *G06F 16/21* | (2019.01) |
| *G06F 16/25* | (2019.01) |
| *G06F 16/178* | (2019.01) |

(52) U.S. Cl.
CPC ...... *G06F 11/1469* (2013.01); *G06F 11/1456* (2013.01); *G06F 11/1464* (2013.01); *G06F 16/1794* (2019.01); *G06F 16/219* (2019.01); *G06F 16/258* (2019.01); *G06F 2201/84* (2013.01)

(58) Field of Classification Search
CPC .. G06F 16/1794; G06F 16/116; G06F 16/254; G06F 16/258
See application file for complete search history.

(56) References Cited

U.S. PATENT DOCUMENTS

| | | | |
|---|---|---|---|
| 7,797,279 B1 | 9/2010 | Starling et al. | |
| 8,005,788 B2 | 8/2011 | Leroux et al. | |
| 8,886,900 B2 | 11/2014 | Craft | |
| 9,239,840 B1 | 1/2016 | Acharya | |
| 9,256,472 B2 | 2/2016 | Kakade et al. | |
| 9,612,825 B2 | 4/2017 | Feldman et al. | |
| 10,025,673 B1* | 7/2018 | Maccanti | G06F 11/1466 |
| 2006/0179418 A1* | 8/2006 | Boyd | G06F 16/40 |
| | | | 717/100 |

(Continued)

*Primary Examiner* — Thu Nguyet T Le
(74) *Attorney, Agent, or Firm* — Finnegan, Henderson, Farabow, Garrett & Dunner, LLP (57) ABSTRACT

The present disclosure discloses method and data restoration system for restoring historic data of an enterprise. The data restoration system receives a request from a user through a transformation backup server, for restoring historic data from a legacy storage device of a plurality of legacy storage devices, associated with an enterprise, along with metadata associated with the historic data. The metadata is previously extracted and stored in a format recognizable by the transformation backup server. The data restoration system determines format of the historic data based on the metadata and extracts historic data from the legacy storage device, using at least one of the metadata and a predefined execution process associated with the historic data, based on the format of the historic data. Thereafter, extracted historic data is restored to the user. The present disclosure recovers legacy data as when required without large migration or any data conversion.

15 Claims, 6 Drawing Sheets

(56) References Cited

U.S. PATENT DOCUMENTS

| | | | |
|---|---|---|---|
| 2006/0235899 A1 | 10/2006 | Tucker | |
| 2007/0038857 A1* | 2/2007 | Gosnell | G06F 16/113 |
| | | | 713/165 |
| 2008/0005509 A1* | 1/2008 | Smith | G06F 11/1464 |
| | | | 711/162 |
| 2009/0276591 A1* | 11/2009 | Mu | G06F 11/1469 |
| | | | 711/162 |
| 2013/0205063 A1* | 8/2013 | Zhang | G06F 11/1458 |
| | | | 711/102 |
| 2016/0196183 A1* | 7/2016 | Lu | G06F 16/1794 |
| | | | 707/610 |

* cited by examiner

METHOD AND SYSTEM FOR RESTORING HISTORIC DATA OF AN ENTERPRISE

TECHNICAL FIELD

The present subject matter is related in general to the field of data recovery, more particularly, but not exclusively to method and system for restoring historic data of an enterprise.

BACKGROUND

Today, data is a major aspect in every industry. Storage medias and file formats are of vital importance to store and organize various kinds of data in an effective and efficient manner. Generally, enterprises retain backup data for long term such as, 7 years to 14 years for legal and compliance requirements of business. As data grows, it is archived in to low cost tapes or the storage medias and a copy is retained outside data centres for protection. While the data is retained for several years, technology used for protecting them becomes obsolete which leads to recovery issues. While the technology refresh is a part of any strategic planning, but with the fast-growing technology trends, refresh requirement becomes more frequent.

Today, transformation programs within information technology takes care of technology refresh for future backups, still the information technology would need to retain part of a legacy infrastructure for historical data recovery. This is currently a big challenge, especially for very long-term retention severs. Generally, retaining the legacy infrastructure leads to increase in operational cost and unsupported platform, which always has risks of recovery failures and in turn data loss. There are some existing recovery approaches, which are time consuming, require investment for new system and for upfront data migration to new target media and hence require higher efforts and cost to run it as a migration project. Furthermore, in any backup environment, it is important for backup server to know what it has backed up such as client, media ID, data format, date and time, file attributes, retention details, backup type, linkage to last dependent backup and the like. All these data are stored as metadata in every backup server. To enable recovery from latest backup product, it is important to import meta data from legacy backup environment in a readable format. However, latest backup server does not understand the format of metadata and data written to legacy media by legacy backup system. Some of the media could be multiplexed or written in a special format or encrypted which only that legacy backup server understands.

Currently, dual set of backup infrastructure are maintained in enterprises to address legacy data restoration requests and to address the current and future backup requirements of faster and efficient backup through latest technology. In such systems, legacy backup infrastructure is to be retained till the retention period of last data set. However, such systems result in unsuccessful recoveries at certain time due to old infrastructure. Also, data centre space, cooling and power costs would continue due to parallel set-up. Also, in certain situations, dual set of skilled resource needs be retained which increases work force cost under system maintenance. Further, extended warranty of software and hardware products involved in the legacy backup infrastructure would be required, which would otherwise lead to huge risk of unsupported platform protecting backup data. Moreover, historic data itself can be migrated to new infrastructure upfront. However, end users in such cases have no visibility of what data is retained in legacy setup and hence all requests are manual. Also, it would be a big transformation project by itself depending upon data size, which requires an additional capital investment. Further, few existing technologies includes tools to migrate backed up data from one platform to another. These migrations have challenges in migrating encrypted data and success rate is less. Moreover, once data is attempted to be migrated, integrity of data is not retained as these tools may change format of data from one vender to another. Also, migration requires huge staging storage. In addition, if migration fails, there are chances that the data would be lost forever. Hence, there is a need for an improved system and method for data restore.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for restoring historic data of an enterprise. The method comprises receiving a request from a user through a transformation backup server, for restoring historic data from a legacy storage device of a plurality of legacy storage devices, associated with an enterprise, along with metadata associated with the historic data. The metadata is previously extracted and stored in a format recognizable by the transformation backup server. The method comprises determining format of the historic data based on the metadata, extracting the historic data from the legacy storage device, using at least one of the metadata and a predefined execution process associated with the historic data, based on the format of the historic data, and restoring the extracted historic data to the user.

In an embodiment, the present disclosure may relate to a data restoration system for restoring historic data of an enterprise. The data restoration system may comprise a processor and a memory communicatively coupled to the processor, where the memory stores processor executable instructions, which, on execution, may cause the data restoration system to receive a request from a user through a transformation backup server, for restoring historic data from a legacy storage device of a plurality of legacy storage devices, associated with an enterprise, along with metadata associated with the historic data. The metadata is previously extracted and stored in a format recognizable by the transformation backup server. The data restoration system determines format of the historic data based on the metadata, extracts the historic data from the legacy storage device, using at least one of the metadata and a predefined execution process associated with the historic data, based on the format of the historic data, and restores the extracted historic data to the user.

In an embodiment, the present disclosure relates to a non-transitory computer readable medium including instructions stored thereon that when processed by at least one processor may cause a data restoration system to receive a request from a user through a transformation backup server, for restoring historic data from a legacy storage device of a plurality of legacy storage devices, associated with an enterprise, along with metadata associated with the historic data. The metadata is previously extracted and stored in a format recognizable by the transformation backup server. The instructions may cause the processor to determine format of the historic data based on the metadata, extract the historic data from the legacy storage device, using at least one of the metadata and a predefined execution process associated with the historic data, based on the format of the historic data, and restore the extracted historic data to the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a data restoration system for restoring historic data of an enterprise. In an embodiment, historic data may refer to data associated with the enterprise, which is stored in an old or obsolete format or a system that is, therefore, difficult to access or process. The data restoration system may accept request from a user for restoring historic data associated with the enterprise, along with associated metadata, from a legacy storage device. The historic data may be extracted from the requested legacy storage device using the metadata and a predefined execution process associated with the historic data, based on a format of the historic data. The format of the historic data may be determined to be one of encrypted and standard format. The historic data extracted from the legacy storage device may be restored to the user. In an embodiment, the data restoration system may extract the metadata previously from a legacy backup server associated with the enterprise and store in a format which may be recognized by the transformation backup server. The present disclosure recovers legacy data as when required without large migration or any data conversion.

Figure 1:
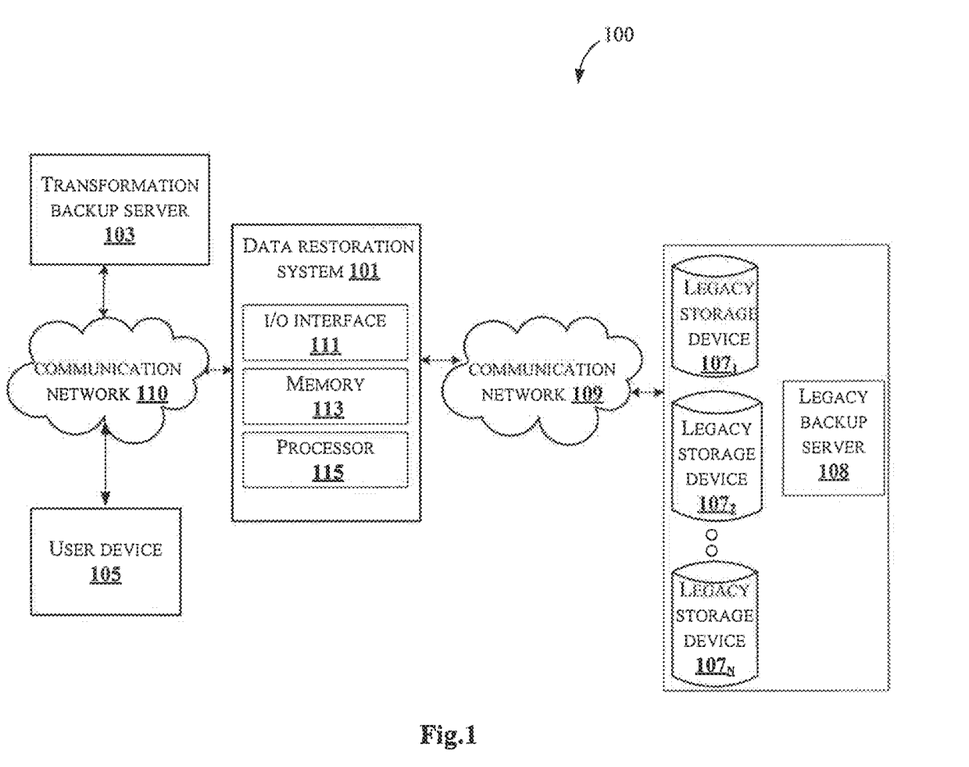
FIG. 1 illustrates an exemplary environment for restoring historic data of an enterprise in accordance with some embodiments of the present disclosure.

FIG. 1 illustrates an exemplary environment for restoring historic data of an enterprise in accordance with some embodiments of the present disclosure.

As shown in FIG. 1, the environment 100 comprises a data restoration system 101 connected through a communication network 109 to a legacy storage device 107$_1$, a legacy storage device 107$_2$, and a legacy storage device 107$_N$ (Collectively referred as plurality of legacy storage devices 107) and a legacy backup server 108 associated with an enterprise. In an embodiment, the plurality of legacy storage devices 107 may include, but are not limited to, backup storage devices, storage tapes, and any other computing devices. A person skilled in the art would understand that, any other legacy storage devices, not mentioned explicitly, may also be used in the present disclosure. In an embodiment, the plurality of legacy storage devices 107 may refer to storage equipment which may be outdated, obsolete and unsupported. In an embodiment, the legacy backup server 108 may comprise a plurality of metadata associated with the plurality of legacy storage devices 107 and logic associated with the historic data. Further, the communication network 109 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. Further, the data restoration system 101 is also connected through a communication network 110 to a transformation backup server 103 and to a user device 105. In one embodiment, the transformation backup server 103 may be installed on a server with a local database. In an embodiment, the transformation backup server 103 may refer to a backup server of a current technology platform. In an embodiment, the transformation backup server 103 may be configured to store the plurality of metadata associated with the legacy backup server 108. In an embodiment, the plurality of metadata may refer to a set of data associated with the historic data. In an embodiment, the user device 105 associated with the users may include, backup clients, workloads, servers, and the like associated with the enterprise. The data restoration system 101 restores requested historic data from legacy storage devices. In an embodiment, the data restoration system 101 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used as the data restoration system 101 in the present disclosure. The data restoration system 101 may receive a request from the user device 105 associated with users, through the transformation backup server 103, for restoring historic data from a legacy storage device of the plurality of legacy storage devices 107. At the outset, the data restoration system 101 may extract the plurality of metadata, from the legacy backup server 108 and store in the transformation backup server 103 in a format which may be recognizable by the transformation backup server 103. In an embodiment, the legacy backup server 108 may be deactivated after the extraction of the plurality of metadata. Initially, the request for restoring the historic data may be received by the transformation backup server 103 from the user device 105. The transformation backup server 103 may locate the metadata associated with the requested historic data from the plurality of metadata, stored in the transformation backup server 103 and may send the request along with the metadata to the data restoration system 101. In an embodiment, the metadata comprises a job identification number and a media identification number of the historic data, a plurality of details associated with backed up data, files attributes, a time stamp and a plurality of encryption keys associated with the historic data, details of the legacy storage device from which historic data is requested and details of historic data requested, data format, and client details associated with the historic data. A person skilled in the art would understand that any other metadata, not mentioned explicitly, may also be received in the present disclosure. Further, the data restoration system 101 may determine a format of the historic data requested based on the metadata. In an embodiment, the format of the requested historic data may comprise encrypted and standard format. Thereafter, the data restoration system 101 may extract the historic data from the legacy storage device of the plurality of legacy storage devices 107 using at least one of the metadata and a predefined execution process associated with the historic data, based on the format of the historic data. In an embodiment, the predefined execution process may refer to a process for recovering historic data in any medium. In an embodiment, the predefined execution process may comprise binaries, cmdlets, and daemons processes. The data restoration system 101 may restore the extracted historic data to the user device 105. In an embodiment, the data restoration system 101 may update a status of user request to the transformation backup server 103 on restoring the requested historic data to the user device 105.

The I/O interface 111 may be configured to receive the request for restoring the historic data, from the user device 105, through the transformation backup server 103. The I/O interface 111 may receive the metadata associated with the historic data from the transformation backup server 103. Further, the I/O interface 111 may provide the historic data from the legacy storage device of the plurality of legacy storage devices 107 to the user device 105.

The information received from the I/O interface 111 may be stored in the memory 113. The memory 113 may be communicatively coupled to the processor 115 of the data restoration system 101. The memory 113 may also store processor instructions which may cause the processor 115 to execute the instructions for restoring the historic data of the enterprise.

Figure 2:
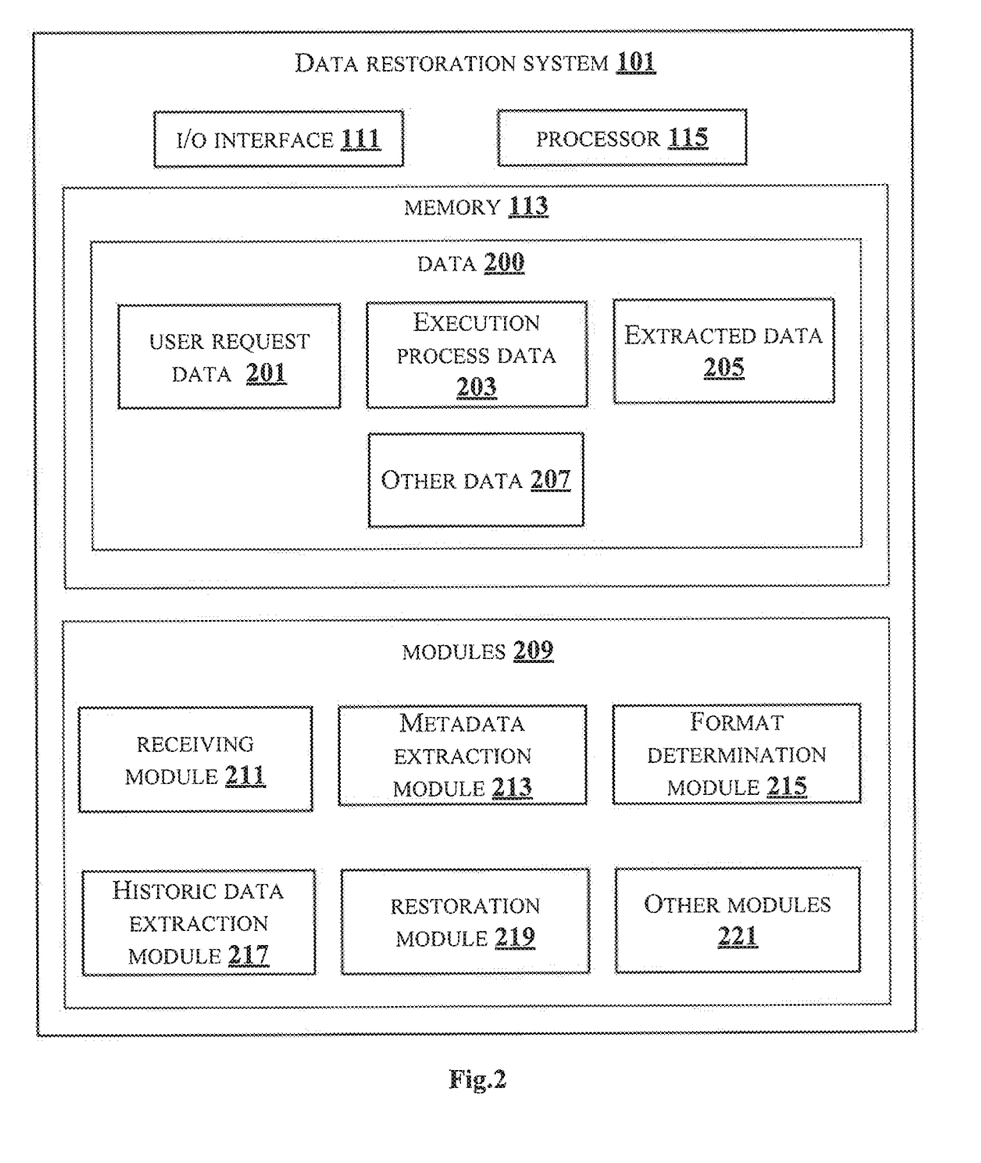
FIG. 2 shows a detailed block diagram of a data restoration system in accordance with some embodiments of the present disclosure.

FIG. 2 shows a detailed block diagram of a data restoration system in accordance with some embodiments of the present disclosure.

Data 200 and one or more modules 209 of the data restoration system 101 are described herein in detail. In an embodiment, the data 200 may include user request data 201, execution process data 203, extracted data 205 and other data 207.

The user request data 201 may comprise the request details from the user device 105 for restoring the historic data from the legacy storage device of the plurality of legacy storage devices 107. The user request data 201 may also comprise details of the metadata associated with the historic data. The metadata associated with the historic data is located and added to the user request data 201 by the transformation backup server 103, before sending the user request to the data restoration system 101. In an embodiment, the metadata may comprise a job identification number and a media identification number of the historic data, a plurality of details associated with backed up data, files attributes, a time stamp and a plurality of encryption keys associated with the historic data, details of the legacy storage device from which historic data is requested and details of historic data requested, data format, and client details associated with the historic data.

The execution process data 203 may comprise details of the execution processes associated with the historic data. In an embodiment, the execution processes may comprise binaries, cmdlets, daemons and the like to recover the historic data from an encrypted format. In an embodiment, execution processes are used to recover data from any media. A person skilled in the art would understand that any other execution processes, not mentioned explicitly, may also be included in the present disclosure.

The extracted data 205 may comprise the extracted historic data from the plurality of legacy storage devices 107. The extracted historic data is provided to the user device 105 through which the request was initiated.

The other data 207 may store data, including temporary data and temporary files, generated by modules 209 for performing the various functions of the data restoration system 101.

In an embodiment, the data 200 in the memory 113 are processed by the one or more modules 209 of the data restoration system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 209 when configured with the functionality defined in the present disclosure will result in a novel hardware.

In one implementation, the one or more modules 209 may include, but are not limited to a receiving module 211, a metadata extraction module 213, a format determination module 215, a historic data extraction module 217 and a restoration module 219. The one or more modules 209 may also include other modules 221 to perform various miscellaneous functionalities of the data restoration system 101. In an embodiment, the other modules 221 may include an execution process determination module for determining the execution process associated with the requested historic data and an update module for updating a status of the user request to the transformation backup server 103, on restoring the requested historic data to the user device 105.

The receiving module 211 may receive the request from the user device 105 of the users, for restoring the historic data from the legacy storage device of the plurality of legacy storage device 105, through the transformation backup server 103. The receiving module 211 may also receive the metadata associated with the requested historic data from the transformation backup server 103 along with the request. In an embodiment, the transformation backup server 103 may locate the metadata associated with the requested historic data from the plurality of metadata.

The metadata extraction module 213 at the outset, before receiving any request from the user device 105, may extract the metadata from the legacy backup server 108 associated with the enterprise. The metadata extraction module 213 may extract the metadata and store in the transformation backup server 103 in the format recognized by the transformation backup server 103.

Figure 3:
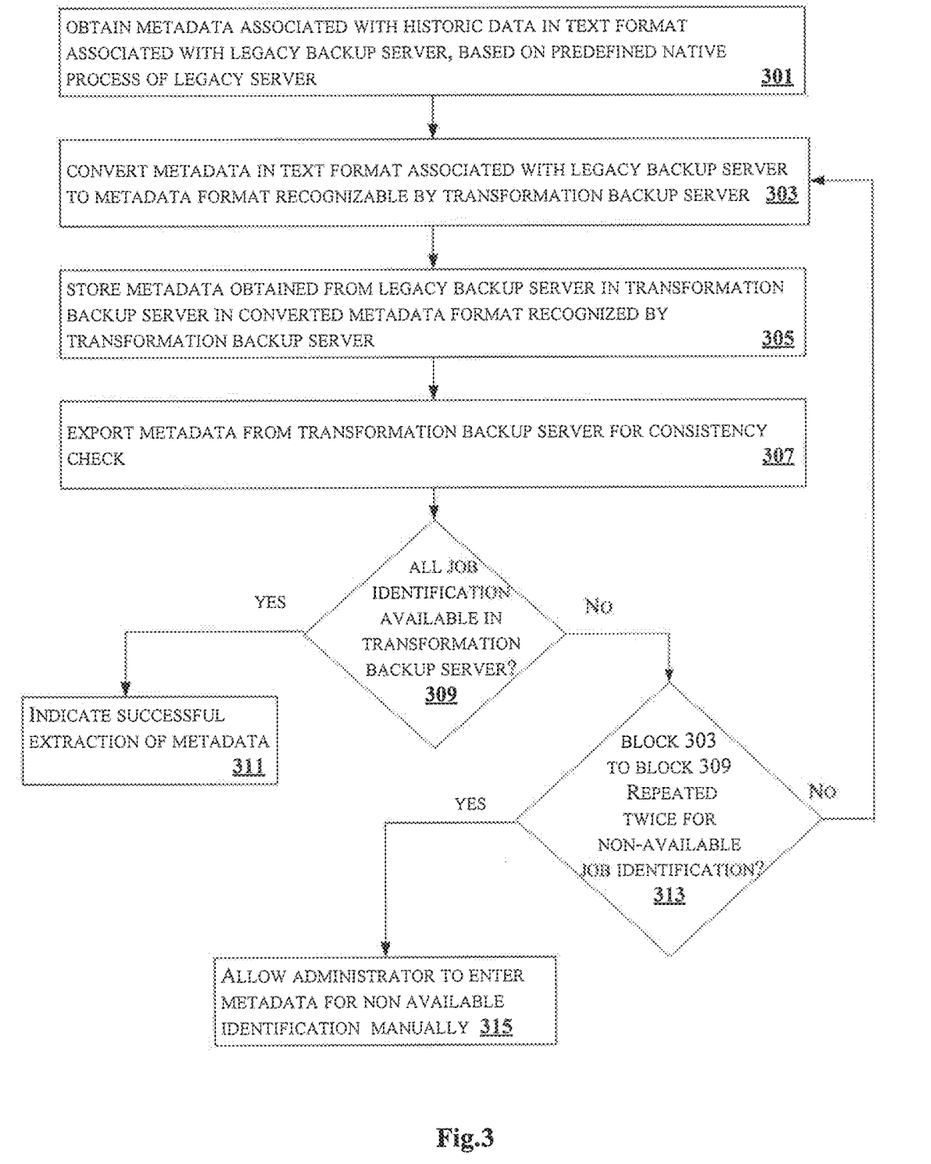
FIG. 3 shows a flowchart for extracting metadata from legacy backup server in accordance with some embodiments of the present disclosure.

FIG. 3 shows a flowchart for extracting metadata from legacy backup sever in accordance with some embodiments of the present disclosure.

At block 301, the metadata extraction module 213 may obtain the metadata associated with the historic data in text format such as, Comma Separated Values (CSV) format of the legacy backup server 108 based on a predefined native process of the legacy backup server 108. In an embodiment, the predefined native process may comprise instructions specific to the legacy storage device for restoring the historic data. In an embodiment, the metadata associated with the historic data may comprise the job identification number and the media identification number of the historic data, the plurality of details associated with backed up data, files attributes, the time stamp and the plurality of encryption keys associated with the historic data, details of the legacy storage device from which historic data is requested and details of historic data requested, data format, and client details associated with the historic data.

At block 303, the metadata extraction module 213 may convert the metadata associated with the legacy backup server 108 in a format recognized by the transformation backup server 103. In an embodiment, the conversion may include rearranging the table fields to match the format followed in the transformation backup server 103.

At block 305, the metadata extraction module 213 may store the metadata in the transformation backup server 103, obtained from the legacy backup server 108 in the converted format of the transformation backup server 103.

At block 307, the metadata extraction module 213 may export the metadata from the transformation backup server 103 for consistency check.

At block 309, the metadata extraction module 213 may check if all the job identification number associated with historic data are available in the transformation backup server 103. If all the job identification number are available, the method moves to block 311. Alternatively, for the non-available job identification number, the method moves to block 313.

At block 311, the metadata extraction module 213 may indicate successful extraction of the metadata for all available job identification number.

At block 313, the metadata extraction module 213 may check if the process from block 303 to block 309 for the non-available job identification number is repeated twice. If the process from block 303 to block 309 for the non-available job identification number is repeated twice, the method moves to block 315. Alternatively, if the process from block 303 to block 309 for the non-available job identification number is not repeated twice, the method may repeat the process from block 303 until the metadata for all the non-available job identification is extracted successfully.

At block 315, the metadata extraction module 213 may allow and alert an administrator to manually enter the metadata associated with the non-available job identification number.

The format determination module 215 may determine the format of the historic data based on the metadata associated with the historic data. The format determination module 215 may check and determine if the requested historic data is in one of, the encrypted format or the standard format. In an embodiment, the encrypted format may refer to data in cipher form. In an embodiment, the standard format may refer to data in human readable form.

The historic data extraction module 217 may extract the historic data from the legacy storage device of the plurality of legacy storage devices 107. The historic data extraction module 217 may extract the historic data using the metadata associated with the historic data, when the format of the historic data is determined to be of the standard format. In such case, the historic data extraction module 217 may extract the historic data by reading storage tape using native open format. Further, the historic data extraction module 217 may extract the historic data using the metadata and the predefined execution process associated with the historic data, when the format of the historic data is determined to be of the encrypted format.

The restoration module 219 may restore the extracted historic data to the user device 105.

Figure 4:
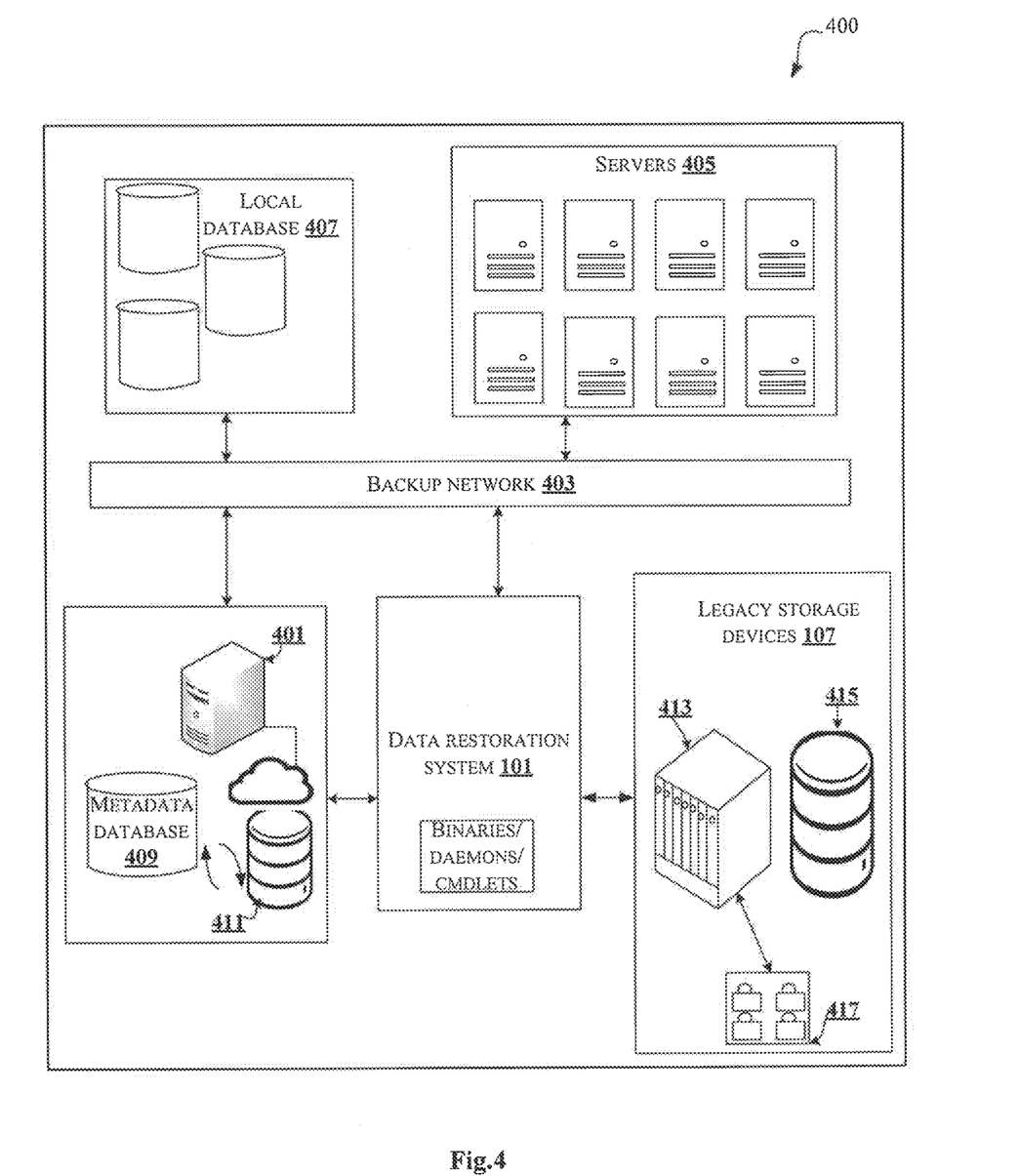
FIG. 4 show an exemplary representation of restoring historic data of an enterprise in accordance with some embodiments of the present disclosure.

FIG. 4 show an exemplary representation of restoring historic data of an enterprise in accordance with some embodiments of the present disclosure. FIG. 4 shows an exemplary representation 400 of restoring historic data for an enterprise. The exemplary representation 400 comprises a transformation backup server 401 of the enterprise, which is coupled to a backup network 403. The backup network 403 is coupled to user device 105 such as, servers 405. The backup network 403 is also coupled to a local database 407. In an embodiment, the transformation backup server 401 may be configured in the local database 407. The transformation backup server 401 comprises a metadata database 409. The transformation backup server 401 may also comprise a storage server 411 configured to receive the request from the servers 405. Further, the exemplary transformation backup server 401 is connected to the data restoration system 101 for restoring the historic data associated with the enterprise from the legacy storage devices 107. The legacy storage devices 107 comprises a tape library 413, a legacy backup server 415 and an offsite storage area 417. Initially, the data restoration system 101 may extract the metadata associated with the enterprise from the legacy backup server 415 and store in the metadata database 409 of the transformation backup server 401. Consider, the data restoration system 101 may extract the metadata of tape data stored in the tape library 413. For example, the metadata associated with the tape data may comprise the job identification number as "123456T", the media identification number as "M4562", file attributes, such as, file type, file permission, file extension etc. Further, timestamp associated with the tape data as "2009-05-1D1T15:48:45", the encryption key as "TP124", details of legacy storage device as "tape library 44T" and data format of the tape data as "Digital Audio Tape (DAT)" format.

In an embodiment, the data restoration system 101 may convert the format of the historic data to the format recognized by the transformation backup server 401. In an embodiment, while extracting the metadata, the data format for each media may be captured and updated in the metadata database 409. Consider, at an instant, the data restoration system 101 may receive the request from the servers 405 for restoring the tape data from the tape library 413 through the transformation backup server 401 In an embodiment, the transformation backup server 401 may locate the metadata of the tape data from the metadata database 409 and provide the request along with the metadata to the data restoration system 101. The data restoration system 101 may determine the format of the tape data based on the metadata. In an embodiment, the format of the requested historic data comprises encrypted and standard format. In an embodiment, the encrypted format may refer to encoded form of data, where encoding may be performed using encryption technique. A person skilled in the art would understand that any encryption techniques may be used in the present disclosure. In an embodiment, the standard format may refer to any readable format of historic data. In the present case, the format of the tape data is determined to be DAT format based on the metadata. For instance, the data restoration system 101 determines the format of the tape data to be in encrypted format based on the metadata. In such case, the data restoration system 101 may extract the tape data from the tape library 413 using the predefined execution process associated with the tape data. In an embodiment, the predefined execution process is used for recovering data from any medium. In an embodiment, the predefined execution process may comprise binaries, cmdlets and daemons processes. For instance, the data restoration system 101 may initiate the daemon process associated with the tape data to recover the tape data. The data restoration system 101 may restore the extracted tape data from the tape library 413 to the servers 405. Further, the data restoration system 101 may update the status of the request from the servers 405 to the transformation backup server 401, on restoring the requested tape data to the servers 405.

Figure 5:
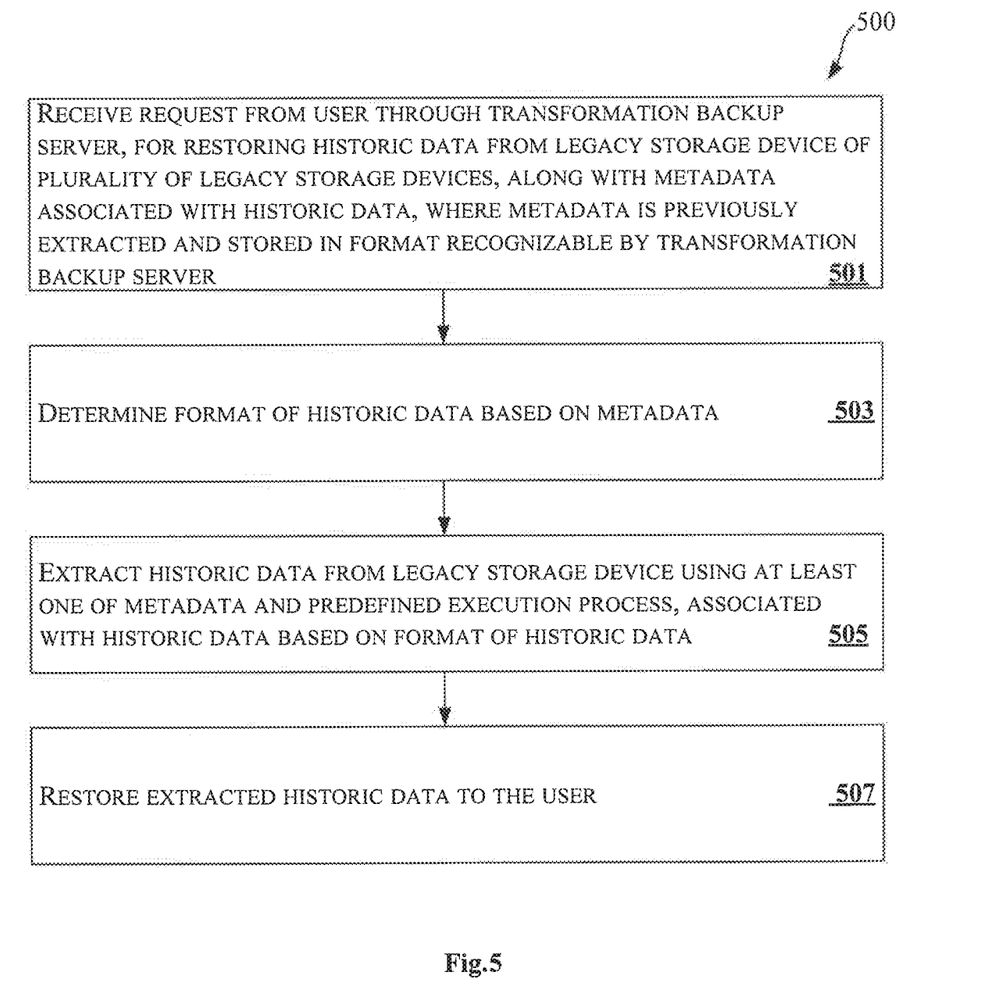
FIG. 5 illustrates a flowchart showing a method for restoring historic data of an enterprise in accordance with some embodiments of present disclosure.

FIG. 5 illustrates a flowchart showing a method for restoring historic data of an enterprise in accordance with some embodiments of present disclosure. As illustrated in FIG. 5, the method 500 includes one or more blocks for restoring historic data of an enterprise. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 501, the request from the user is received from the receiving module 211, through the transformation backup server 103, for restoring historic data from the legacy storage device of the plurality of legacy storage devices 107, associated with the enterprise. The request is received along with metadata associated with the historic data. The metadata associated with the historic data is previously extracted and stored by the metadata extraction module 213 in the format recognizable by the transformation backup server 103.

At block 503, the format of the historic data is determined, by the format determination module 215, based on the metadata.

At block 505, the historic data is extracted, by the historic data extraction module 217, from the legacy storage device, using at least one of the metadata and a predefined execution process associated with the historic data, based on the format of the historic data.

At block 507, the extracted historic data is restored, by the restoration module 219 to the user.

Figure 6:
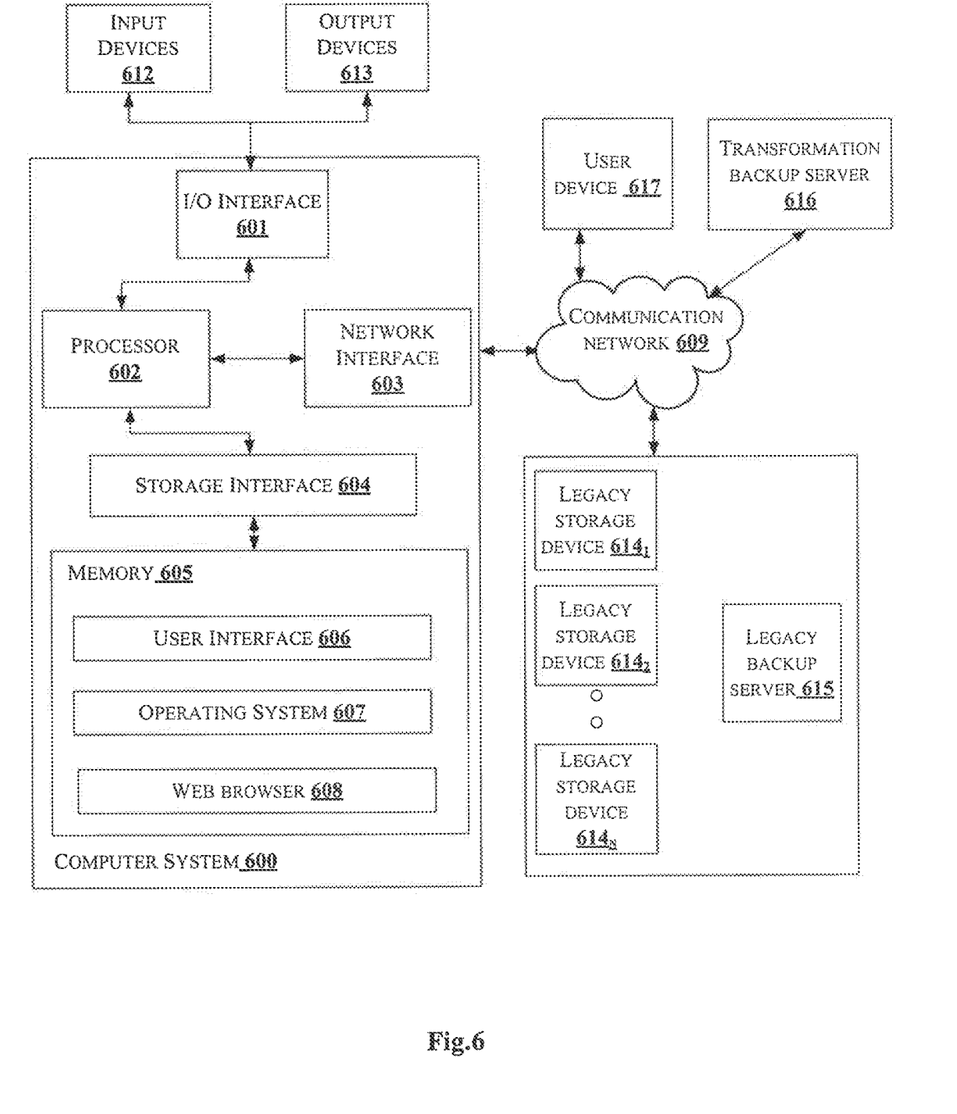
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the data restoration system 101. The computer system 600 may include a central processing unit ("CPU" or "processor") 602. The processor 602 may include at least one data processor for restoring historic data of an enterprise. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 consists of the data restoration system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with a legacy storage device $614_1$, a legacy storage device $614_2$ and a legacy storage device $614_N$ (plurality of legacy storage device 614) and a legacy backup server 615. Further, the computer system 600 may also communicate with a transformation backup server 616 and a user device 617. The network interface 603 may employ connection protocols include, but not limited to, direct connect, Ethernet (e.g., twisted pair 10/100/1000 Base T), transmission control protocol/internet protocol (TCP/IP), token ring, IEEE 802.1a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XPM™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVE™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure helps enterprises to recover legacy data as when required without large migration or data conversion project.

An embodiment of the present disclosure keeps data integrity intact till its retention period.

An embodiment of the present disclosure supports heterogeneous legacy system.

An embodiment of the present disclosure eliminates cost for staging area.

An embodiment of the present disclosure reduces time in restoring data by directly writing back to requested server.

An embodiment of the present disclosure enables restoration of all formats of media with encryption and multiplexed streams as well.

An embodiment of the present disclosure with help of meta data conversion enables users to explore data backed up using legacy systems.

An embodiment of the present disclosure eliminates upfront data migration required from old medias to new storage or tape media.

An embodiment of the present disclosure eliminates legacy infrastructure and resources required to support legacy backup servers for any future data migration and restoration.

An embodiment of the present disclosure eliminates use of expensive third-party restoration specialists and servers for restoration and migration services.

An embodiment of the present disclosure recovers data without converting data format by leveraging native processes and hence better success rate is achieved.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Data restoration system |
| 103 | Transformation backup server |
| 105 | User device |
| 107 | Plurality of legacy storage devices |
| 108 | Legacy backup server |
| 109 | Communication network |
| 110 | Communication network |
| 111 | I/O interface |

-continued

| Reference Number | Description |
| --- | --- |
| 113 | Memory |
| 115 | Processor |
| 200 | Data |
| 201 | User request data |
| 203 | Execution process data |
| 205 | Extracted data |
| 207 | Other data |
| 209 | Modules |
| 211 | Receiving module |
| 213 | Metadata extraction module |
| 215 | Format determination module |
| 217 | Historic data extraction module |
| 219 | Restoration module |
| 221 | Other modules |
| 401 | Transformation backup server |
| 403 | Backup networks |
| 405 | Servers |
| 407 | Local database |
| 409 | Metadata database |
| 411 | Storage server |
| 413 | Tape library |
| 415 | Legacy backup server |
| 417 | Offsite storage area |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web browser |
| 609 | Communication network |
| 612 | Input devices |
| 613 | Output devices |
| 614 | Plurality of legacy storage devices |
| 615 | Legacy backup server |
| 616 | Transformation backup server |
| 617 | User device |

What is claimed is:

1. A method for restoring historic data of an enterprise, the method comprising:
receiving, by a data restoration system, a request from a user through a transformation backup server, for restoring historic data from a legacy storage device of a plurality of legacy storage devices, associated with an enterprise, along with metadata associated with the historic data, wherein the metadata is previously extracted and stored in a format recognizable by the transformation backup server;
determining, by the data restoration system, format of the historic data as encrypted format, based on the metadata, wherein the encrypted format indicates that the historic data is in cipher form which only that the legacy storage device understands,
wherein the metadata comprises a time stamp and a plurality of encryption keys associated with the historic data, details of the legacy storage device from which historic data is requested and details of historic data requested, and data format;
extracting, by the data restoration system, the historic data in the encrypted form from the legacy storage device, using at least one of the metadata and a predefined execution process associated with the historic data, based on the format of the historic data, wherein the predefined execution process comprises: binaries, cmdlets and daemons processes to recover the historic data from the encrypted format; and
restoring, by the data restoration system, the extracted historic data to the user.

2. The method as claimed in claim 1, wherein the metadata further comprises a job identification number and a media identification number of the historic data, a plurality of details associated with backed up data, files attributes, and client details associated with the historic data.

3. The method as claimed in claim 1, wherein the format of the requested historic data further comprises a standard format.

4. The method as claimed in claim 1, wherein storing the metadata associated with the historic data comprises:
obtaining, by the data restoration system, the metadata associated with the historic data, in a text format associated with a legacy backup server, based on a predefined native process of the legacy backup server;
converting, by the data restoration system, the metadata in the text format associated with the legacy backup server to a metadata format recognizable by the transformation backup server; and
storing, by the data restoration system, the metadata obtained from the legacy backup server in the transformation backup server in the converted metadata format recognized by the transformation backup server.

5. The method as claimed in claim 1 further comprising updating status of the request to the transformation backup server on restoring the requested historic data.

6. A data restoration system for restoring historic data of an enterprise, comprising:
a processor; and
a memory communicatively coupled to the processor, wherein the memory stores processor instructions, which, on execution, causes the processor to:
receive a request from a user through a transformation backup server, for restoring historic data from a legacy storage device of a plurality of legacy storage devices, associated with an enterprise, along with metadata associated with the historic data, from a transformation backup server, wherein the metadata is previously extracted and stored in a format recognizable by the transformation backup server;
determine format of the historic data as encrypted format, based on the metadata, wherein the encrypted format indicates that the historic data is in cipher form which only that the legacy storage device understands,
wherein the metadata comprises: a time stamp and a plurality of encryption keys associated with the historic data, details of the legacy storage device from which historic data is requested and details of historic data requested, and data format;
extract the historic data in the encrypted form from the legacy storage device, using at least one of the metadata and a predefined execution process associated with the historic data, based on the format of the historic data, wherein the predefined execution process comprises: binaries, cmdlets and daemons processes to recover the historic data from the encrypted format; and
restore the extracted historic data to the user.

7. The data restoration system as claimed in claim 6, wherein the metadata further comprises a job identification number and a media identification number of the historic data, a plurality of details associated with backed up data, files attributes, and client details associated with the historic data.

8. The data restoration system as claimed in claim 6, wherein the format of the requested historic data further comprises standard format.

9. The data restoration system as claimed in claim 6, wherein the processor stores the metadata associated with the historic data by:
 obtaining the metadata associated with the historic data, in a text format associated with a legacy backup server, based on a predefined native process of the legacy backup server;
 converting the metadata in the text format associated with the legacy backup server, to a metadata format recognizable by the transformation backup server; and
 storing the metadata obtained from the legacy backup server in the transformation backup server in the converted metadata format recognized by the transformation backup server.

10. The data restoration system as claimed in claim 6, wherein the processor updates status of the request to the transformation backup server on restoring the requested historic data.

11. A non-transitory computer readable medium including instruction stored thereon that when processed by at least one processor cause a data restoration system to perform operation comprising:
 receiving a request from a user through a transformation backup server, for restoring historic data from a legacy storage device of a plurality of legacy storage devices, associated with an enterprise, along with metadata associated with the historic data, wherein the metadata is previously extracted and stored in a format recognizable by the transformation backup server;
 determining format of the historic data as: encrypted format, based on the metadata, wherein the encrypted format indicates that the historic data is in cipher form which only that the legacy storage device understands, wherein the metadata comprises: a time stamp and a plurality of encryption keys associated with the historic data, details of the legacy storage device from which historic data is requested and details of historic data requested, and data format;
 extracting the historic data in the encrypted form from the legacy storage device, using at least one of the metadata and a predefined execution process associated with the historic data, based on the format of the historic data, wherein the predefined execution process comprises: binaries, cmdlets and daemons processes to recover the historic data from the encrypted format; and
 restoring the extracted historic data to the user.

12. The medium as claimed in claim 11, wherein the metadata further comprises a job identification number and a media identification number of the historic data, a plurality of details associated with backed up data, files attributes, and client details associated with the historic data.

13. The medium as claimed in claim 11, wherein the format of the requested historic data further comprises standard format.

14. The medium as claimed in claim 11, wherein the instruction causes the processor to store the metadata associated with the historic data by:
 obtaining the metadata associated with the historic data, in a text format associated with a legacy backup server, based on a predefined native process of the legacy backup server;
 converting the metadata in the text format associated with the legacy backup server to a metadata format recognizable by the transformation backup server; and
 storing the metadata obtained from the legacy backup server in the transformation backup server in the converted metadata format recognized by the transformation backup server.

15. The medium as claimed in claim 11, wherein the instruction causes the processor to update status of the request to the transformation backup server on restoring the requested historic data.

* * * * *